(12) United States Patent
Chang et al.

(10) Patent No.: US 7,055,158 B2
(45) Date of Patent: May 30, 2006

(54) CD DRIVE MAGAZINE LOCKING APPARATUS

(75) Inventors: Tao-Yuan Chang, Banchiau (TW); Yi-Chen Chang, Banchiau (TW)

(73) Assignee: Eastwin Technology Inc., Taipei (TW)

( * ) Notice: Subject to any disclaimer, the term of this patent is extended or adjusted under 35 U.S.C. 154(b) by 295 days.

(21) Appl. No.: 10/762,259

(22) Filed: Jan. 23, 2004

(65) Prior Publication Data

US 2004/0194118 A1 Sep. 30, 2004

(30) Foreign Application Priority Data

Mar. 27, 2003 (TW) .............................. 92204814 U

(51) Int. Cl.
*G11B 17/04* (2006.01)

(52) U.S. Cl. ..................................... 720/610

(58) Field of Classification Search ................ 720/610, 720/603, 607, 639; 369/75.1, 75.2, 75.11, 369/75.21, 77.1, 77.2, 77.11, 77.21

See application file for complete search history.

(56) References Cited

U.S. PATENT DOCUMENTS 5,528,442 A * 6/1996 Hisatomi .................. 369/30.98
5,629,923 A * 5/1997 Hisatomi .................... 720/615

* cited by examiner

*Primary Examiner*—Allen Cao
(74) *Attorney, Agent, or Firm*—Troxell Law Office, PLLC

(57) ABSTRACT

An improved locking apparatus for a CD drive magazine having its locking alley designed to have a free top and an entrance to admit a locking rod; a wider gradation being disposed at the cross section of the locking alley; a flange being provided at the top of the locking rod; the locking alley holding the magazine in position; a direct connection being defined between the magazine and the locking member by the gradation of the locking alley and the flange of the locking rod to prevent the escape of the magazine from the locking alley thus to firmly secure the magazine in position.

2 Claims, 6 Drawing Sheets

Prior Art FIG.4

CD DRIVE MAGAZINE LOCKING APPARATUS

BACKGROUND OF THE INVENTION (a) Field of the Invention

The present invention is related to an improved locking apparatus for a CD drive magazine, and more particularly, to one that holds the magazine entering into the CD drive in position with a locking member by restring the magazine from slipping off the casing, and further secure the magazine by having both of the magazine and the locking member interlocked to each other to avoid escaping by either of the magazine or the locking member.

(b) Description of the Prior Art

An apparatus of a magazine type of CD drive of the prior art as illustrated in FIG. 1 of the accompanying drawings is essentially comprised of a casing (30) to accommodate multiple members, and a magazine (10) to access to the casing (30) so to load a CD into a fixed location inside the casing (30). The casing contains a drive component (40) to drive the magazine (10) to enter into or exit from the casing (30).

As illustrated in FIGS. 2, and 3, the magazine (10) is fixed in an apparatus comprised of a locking member (20) linked to the drive component and a locking alley (11) provided at where in relation to the locking member (20). Wherein, the locking member (20) includes a locking rod (21) disposed at a right angle to the body of the magazine (10). The locking alley (11) permits the slide in of the locking rod (21) and the locking rod (21) retreats from the locking alley (11) whenever the drive component exits the magazine (10) out of the casing (30). Consequently, the locking alley (11) releases the magazine (10) to clear out of the casing as driven by the drive component (40), or to permit the locking rod (21) of the locking member (20) to slide in at the same time when the drive component pulls in the magazine (10) into the casing (30) to a fixed point as illustrated in FIG. 1 or 4 so to lock the magazine (10) in position inside the casing (30).

The locking apparatus of the prior art serves its purpose of locking the magazine (10) in position by the locking member (20) with the locking rod (21) sliding into the locking alley (11) to prevent the magazine (10) from sliding off the casing (30). However, whenever the CD drive is subject to vibration or hit by an externally applied force, the locking rod (21) escapes from the locking alley (11) to fail its purpose of holding the magazine (10) in position, and the wild magazine (10) will cause damage to the CD drive and the CD due to the absence of a direct connection between the magazine (10) and the locking member (20).

SUMMARY OF THE INVENTION

The primary purpose of the present invention is to provide an improved structure of the locking apparatus for a magazine adapted to a CD drive that firmly secures the magazine in position by preventing the escape of a locking alley from the magazine. To achieve the purpose, the locking alley is designed with a free top end and an entrance is provided at the end of the locking alley where a locking rod is admitted. On one cross section of the locking alley in relation to the top of the locking rod is formed with a wider gradation. The locking member to hold the magazine in position is provided at its top a flange to merely slide into the locking alley. Consequently, when the locking rod slides into the locking alley, the flange of the locking rod and the gradation of the locking alley constitute a direct connection between the magazine and the locking member to prevent the escape of the locking member from the magazine.

BRIEF DESCRIPTION OF THE DRAWINGS

FIG. 4 is a sectional view showing a status of restriction by a locking rod and a locking alley of the magazine locking apparatus of the prior art.

DETAILED DESCRIPTION OF THE PREFERRED EMBODIMENTS

Figure 1:
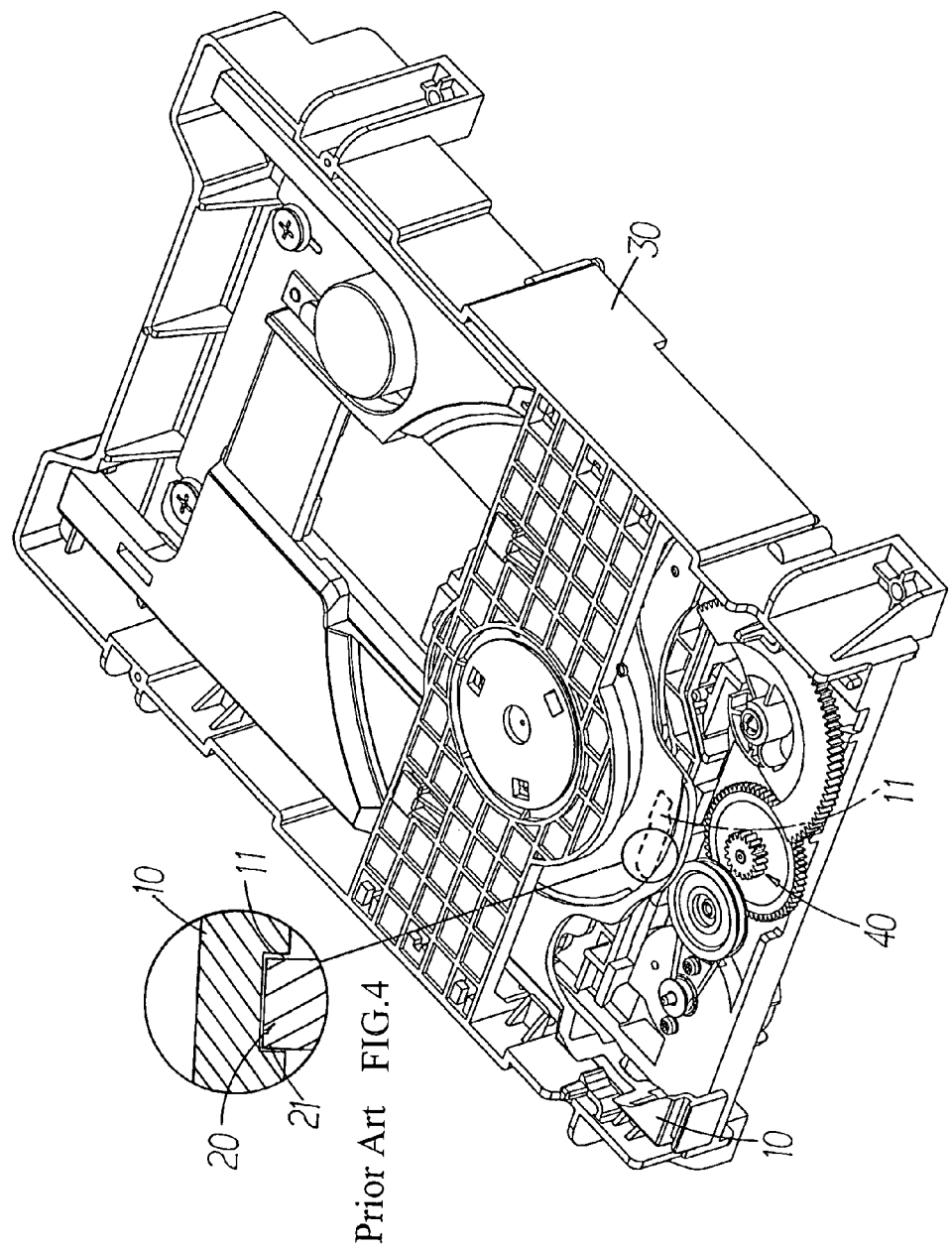
FIG. 1 is a view showing the appearance of a casing and a magazine of a CD drive of the prior art.
Figure 3:
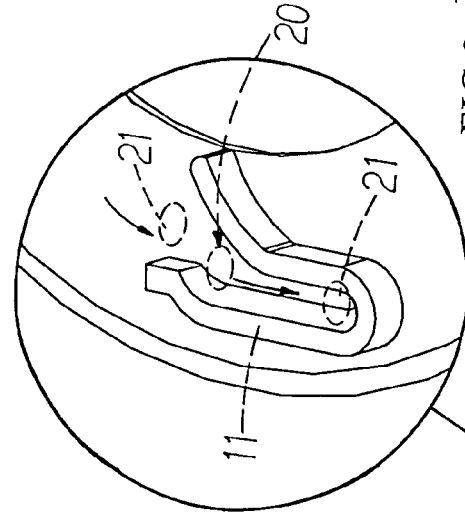
FIG. 3 is a schematic view showing a status of restriction by a locking rod and a locking alley of the magazine locking apparatus of the prior art.
Figure 2:
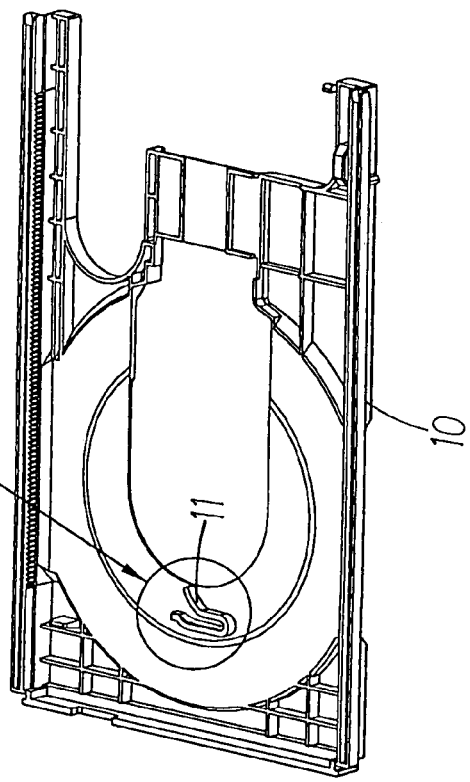
FIG. 2 is a schematic view showing a locking apparatus for a magazine locking apparatus of the prior art.
Figure 5:
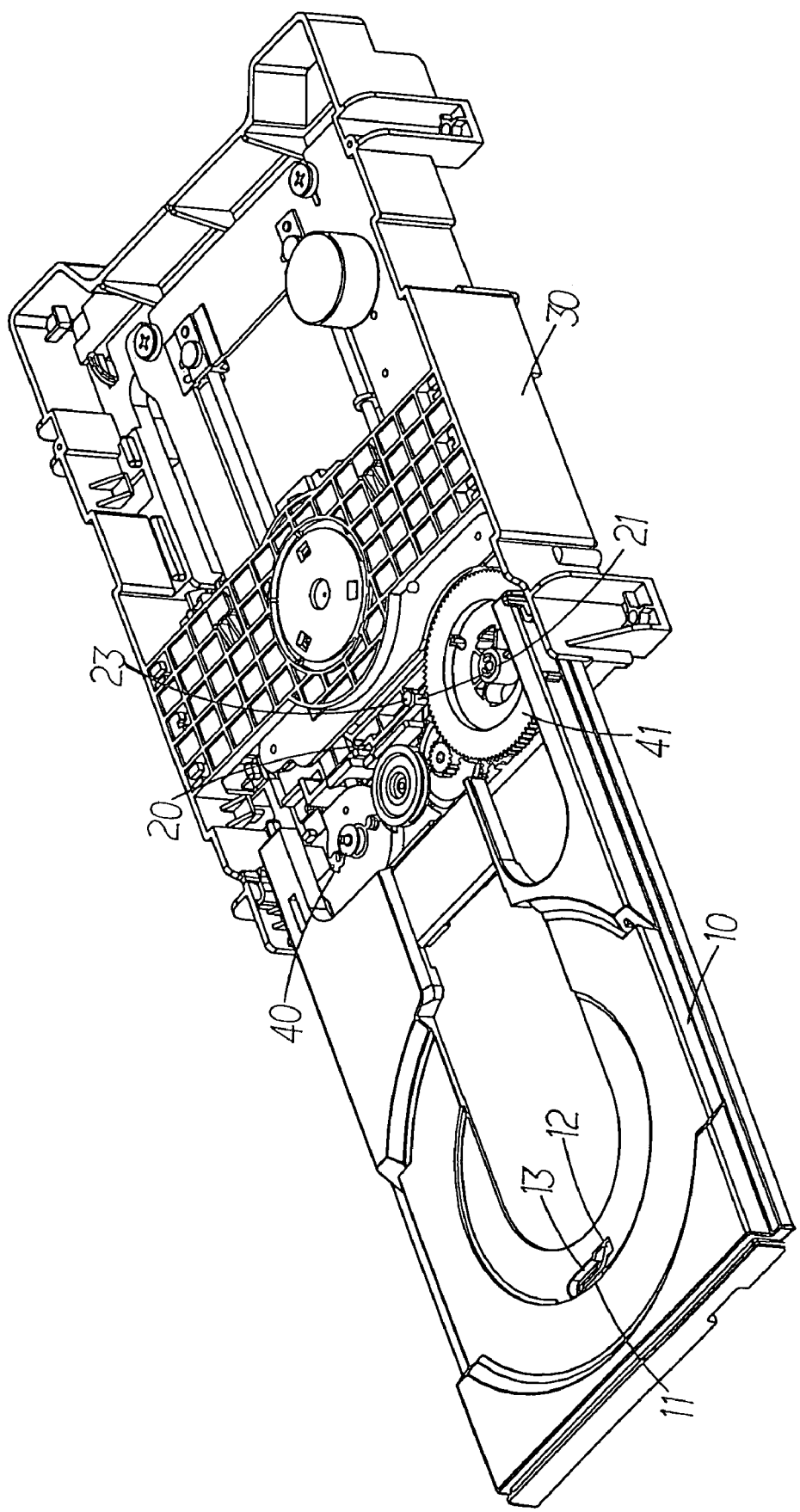
FIG. 5 is a view showing the appearance of a casing and a magazine of a CD drive of the prior art applied in the present invention.
Figure 6:
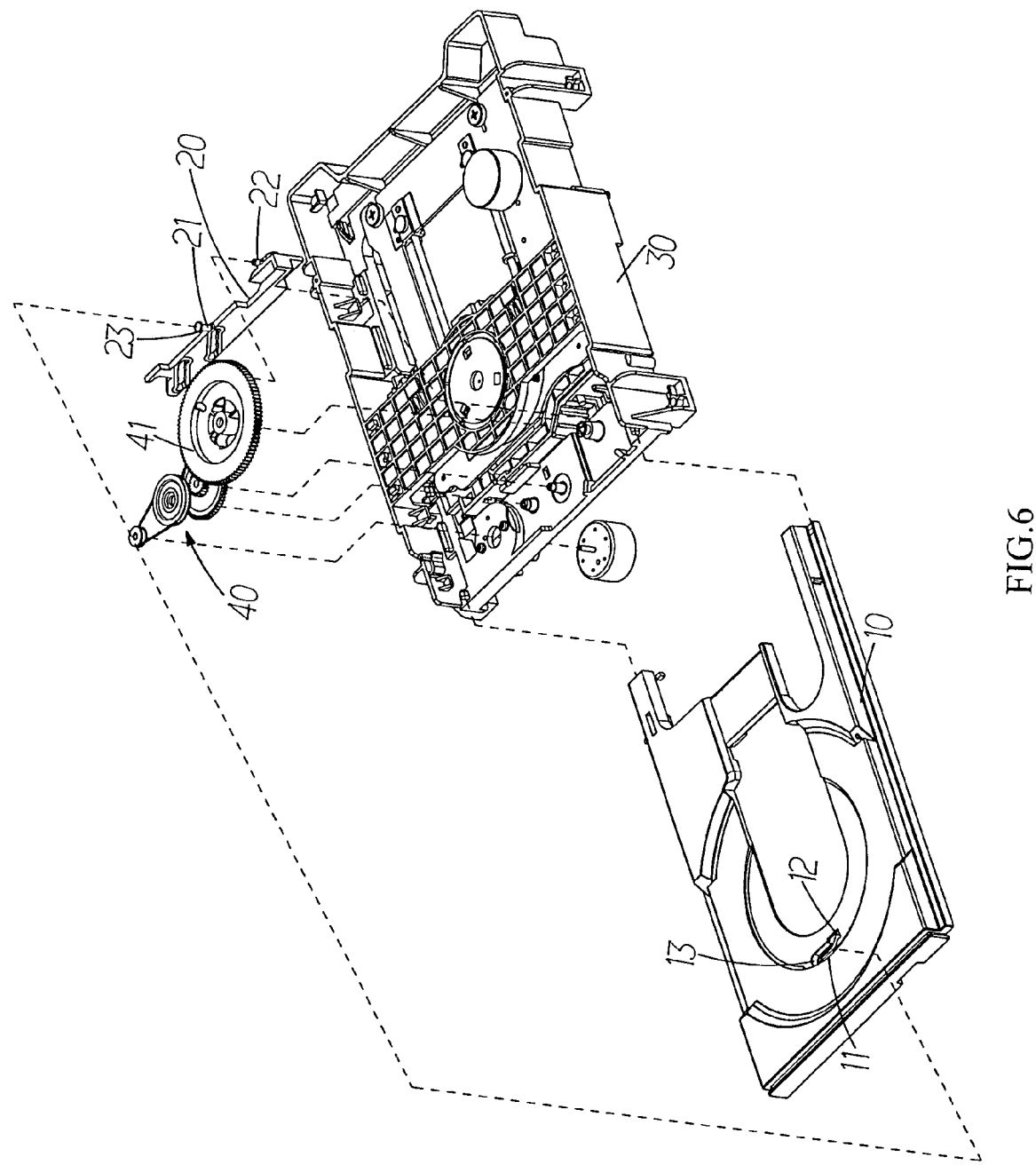
FIG. 6 is an exploded view of a casing, a magazine and a drive component of the prior art applied in the present invention.

The structure of a CD drive of the present invention of a magazine locking apparatus for a CD drive as illustrated in FIGS. 5 and 6 is basically the same as that of the prior art of a magazine type of CD drive. A preferred embodiment of the present invention is comprised of a casing (30) to accommodate a component and a locking apparatus that allows a magazine (10) to enter into the casing (30) so to load a CD into a fixed location inside the casing (30). The casing (30) contains a drive component (40) to drive the magazine (10) to enter into or exit from the casing (30).

Figure 7:
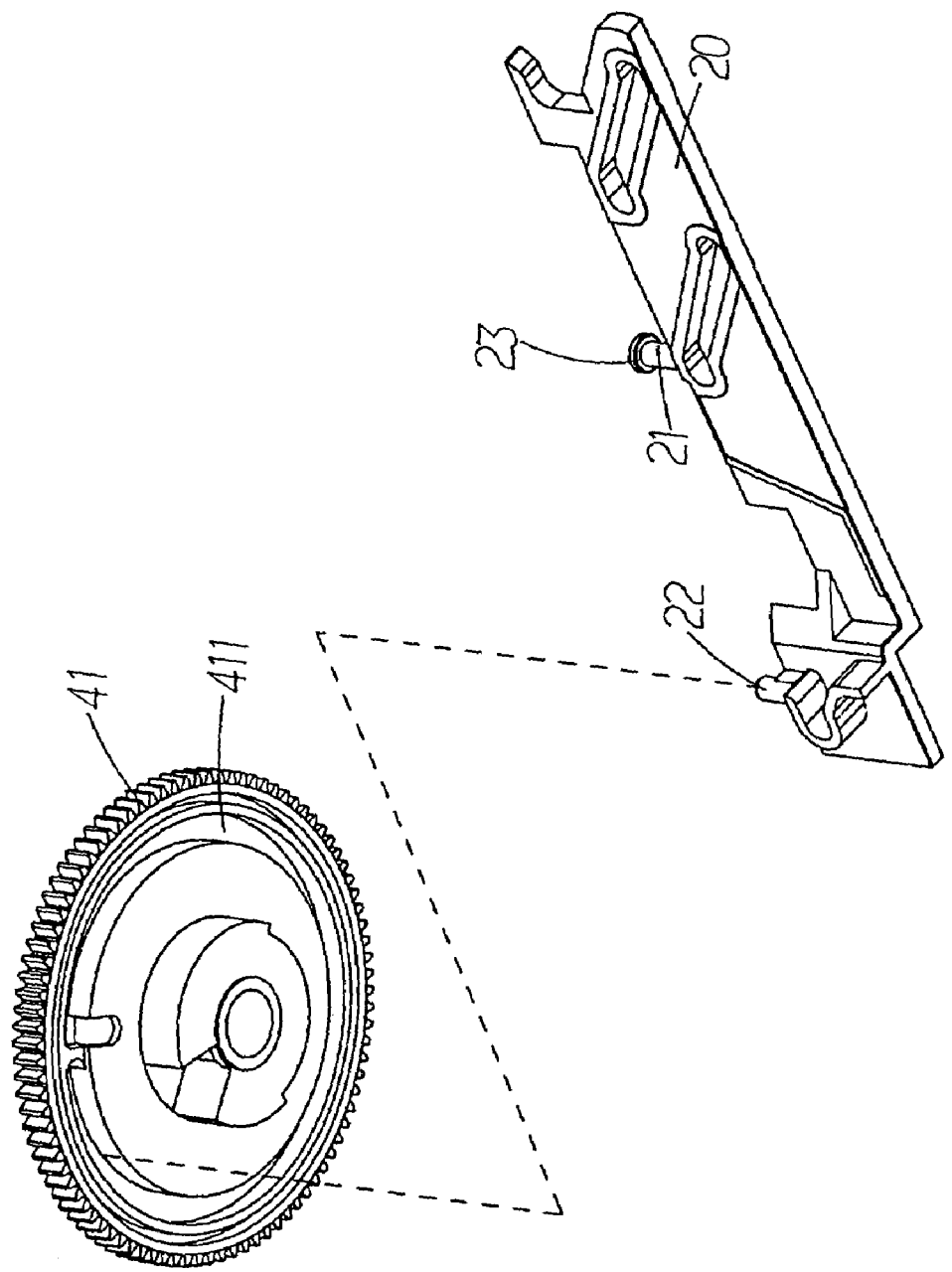
FIG. 7 is an exploded view of the apparatus of a locking member and a gear CD of the present invention.

The locking apparatus includes a locking member (20) linked to the drive component, (40) and a locking alley (11) disposed at wherein relation to whether the magazine is fixed in position. The locking member (20) is adapted with a locking rod (21) at a right angle to the body of the magazine (10), and its locking alley (11) is provided to admit the locking rod (21). As illustrated in FIGS. 6 and 7, the drive component (40) is comprised of a gear disc (41) to drive the magazine to move, and a cam groove (411) is provided on the surface of the gear disc (41). The locking member (20) is provided with a pin (22) to merely reach into the cam groove (411) to link between the pin (22) and the cam groove (411) when the gear disc (41) turns around, thus for the locking rod (21) to slide into or retreat from the locking alley (11) when the locking member (20) is driven by the gear disc (41).

While the drive component (40) retreats the magazine out of the casing (30), the locking rod (21) exist from the locking alley (11) at the same time so to release the magazine (10) for it to exit from the casing (30) as driven by the drive component (40). On the contrary, when the drive component (40) pulls the magazine (10) into a fixed point inside the casing (30), the locking rod (21) slides into the locking alley (11) to secure the magazine (10) in position inside the casing (30).

Figures 8, 9:
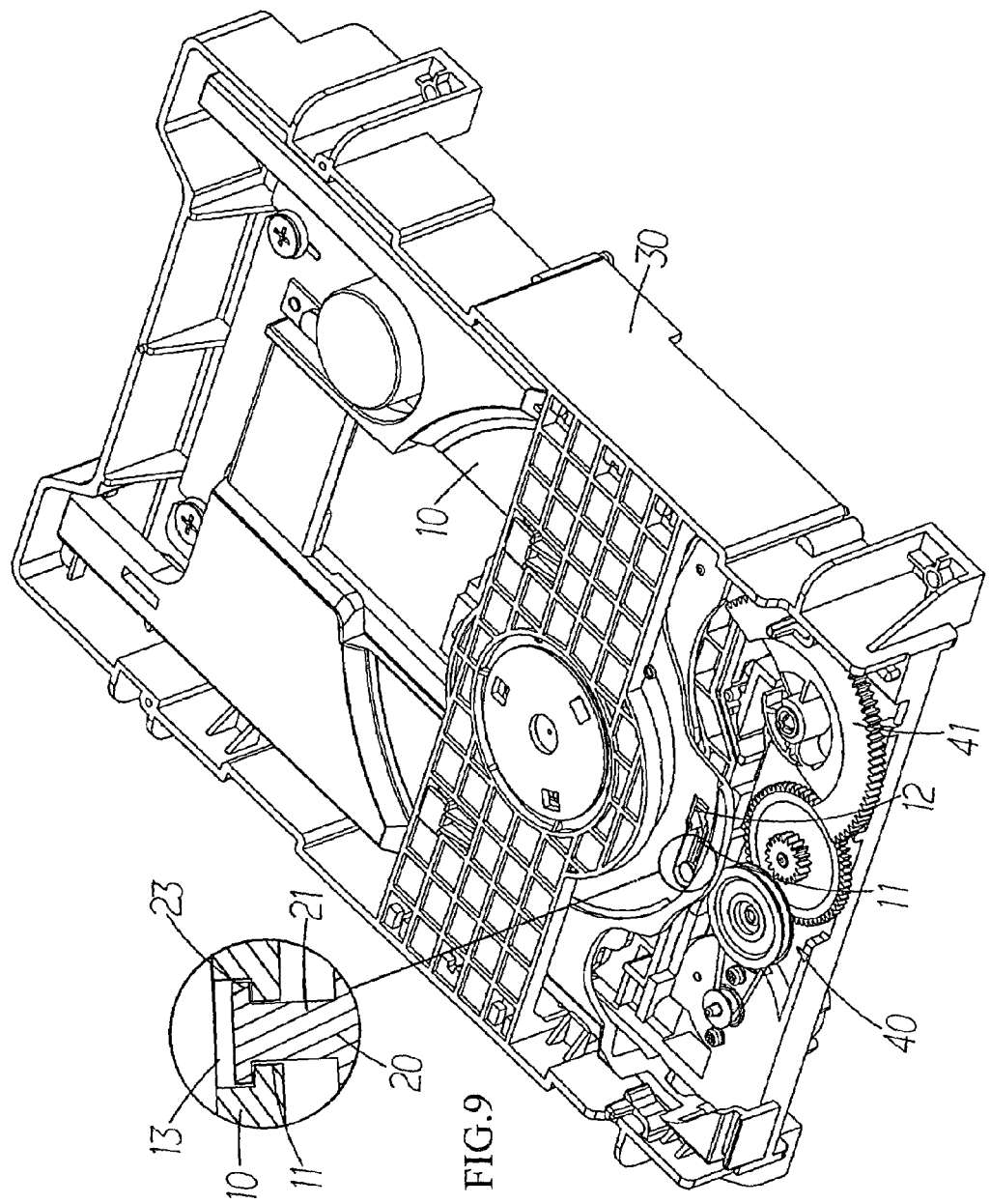
FIG. 8 is a schematic view of an appearance of the locking status of the magazine of the prior art used in the present invention.
FIG. 9 is a sectional view showing the connection status between the locking member and the magazine of the present invention.

Now referring to FIGS. 7, 8 and 9, the locking apparatus of the present invention is further having the locking alley (11) of the magazine designed into one with a free top. Wherein, an entrance (12) is provided at the end in relation to where the locking rod (21) slides into the locking alley, and cross section of the locking alley is formed with a wider gradation (13) on the side in relation to the top of the locking rod (21). Meanwhile, a flange (23) is disposed at the top of the locking rod (21) to constitute a direct connection between the magazine (10) and the locking member (20) as illustrated in FIG. 9 when the locking rod (21) slides into the locking alley (11) to prevent the escape of the locking member (20) out of the magazine (10), and thus to firmly secure the magazine (10) in position.

As disclosed above, the locking apparatus for a CD drive provides a better feasible locking structure for the magazine type of CD drive. Therefore, this application for a utility patent is duly filed accordingly; however, it should be noted that the preferred embodiment and the accompanying drawings disclosed herein are not used to limit the present invention, and any structure, installation and characteristics that are similar or identical to that of the present invention shall be deemed as falling within the scope of the purposes and claims of the present invention.

We claim:

1. A locking apparatus for a magazine of a CD drive magazine comprising a magazine and a CD drive; the CD drive being comprised of a casing to accommodate multiple members containing a drive component to drive the magazine to enter into or exit from the casing, and the locking apparatus for the magazine to access to the casing for loading a CD into a fixed location inside the casing; the locking apparatus including a locking member linked to the drive component and a locking alley provided in relation to the locking alley at where the magazine is held in a position; the locking member being provided with a locking rod disposed at a right angle to the body of the magazine; the locking alley being provided to admit the locking rod to slide in; the drive component driving the magazine to retreat from the casing or pull the magazine into a fixed location inside the casing; and the locking alley operating according to the magazine as driven by the drive component, is characterized by that: the locking alley having a free top; an entrance being provided at one end of the locking alley at where to admit the locking rod to slide in; a wider gradation being provided to the cross section of the locking alley at where in relation to the top of the locking rod; a flange being provided at the top of the locking rod; a direct connection being defined between the magazine and the locking member by the flange of the locking rod and the gradation of the locking alley when the locking rod sliding in the locking alley to prevent the escape of the magazine from the locking alley thus to firmly secure the magazine in a position.

2. A locking apparatus for a CD drive magazine drive as claimed in claim 1, wherein, the drive component includes a gear disc to drive the magazine; a cam groove being disposed on the surface of the gear disc; a pin to reach the cam groove being provided to the locking member; a linking being provided between the cam groove and the pin when the gear disc is turning around, thus for the locking member to slide in or exit from the locking alley.

* * * * *